United States Patent [19] [11] 3,682,907
Ohkawa et al. [45] Aug. 8, 1972

[54] 4,4'-BIS(2-β-SULFOETHYLAMINO-4-AMINO-1,3,5-TRIAZINE-6-YLAMINO)STILBENE-2,2'-DISULFONIC

[72] Inventors: Masaaki Ohkawa, Takatsuki; Masatoshi Matsuo, Ibaraki; Tadao Sakaguchi, Taisho-ku, Osaka; Syozi Sato, Hirakata, all of Japan

[73] Assignee: Sumitomo Chemical Co., Ltd., Osaka, Japan

[22] Filed: Sept. 2, 1969

[21] Appl. No.: 854,773

[30] Foreign Application Priority Data

Sept. 12, 1968 Japan......................43/66312

[52] U.S. Cl.........260/240 B, 106/193 D, 117/33.5 R, 252/301.2 W, 260/37 N
[51] Int. Cl..............................................C07d 99/02
[58] Field of Search...................260/240 B

[56] References Cited
UNITED STATES PATENTS 3,532,692  10/1970  Gold et al..................260/240
3,479,349  11/1969  Allison et al...............260/240

*Primary Examiner*—Henry R. Jiles
*Assistant Examiner*—G. Thomas Todd
*Attorney*—Wenderoth, Lind & Ponack

[57] ABSTRACT

Novel compounds of the formula

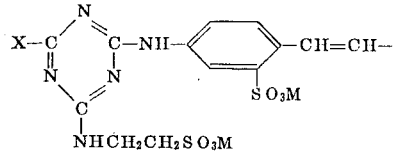
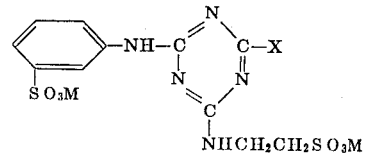

(I)

wherein X is morpholino or alkanolamino and M is a hydrogen atom or an alkali metal, useful as optical brightening agents, and process for the production thereof, whitened textile materials and process for production thereof, and whitened and resin-finished textile materials and process for production thereof.

7 Claims, No Drawings

4,4'-BIS(2-β-SULFOETHYLAMINO-4-AMINO-1,3,5-TRIAZINE-6-YLAMINO)STILBENE-2,2'-DISULFONIC

This invention relates to novel optical brightening agents and their production. This invention also relates to optical whitening of textile products by the use of such novel optical brightening agents.

According to this invention there is provided a However, 4,4'-diaminostilbene-2,2'-disulfonic acid derivative of the formula:

(I) 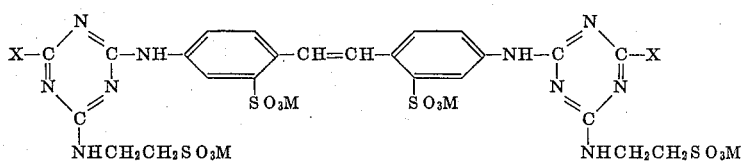

wherein X is morpholino or an alkanolamine residue and M is hydrogen atom or an alkali metal.

The alkanolamine residue is represented by the formula,

wherein $R_1$ and $R_2$ are individually a hydrogen atom, an alkyl group having 1 to 4 carbon atoms or a hydroxyalkyl having 2 to 4 carbon atoms, provided that at least any one of $R_1$ and $R_2$ is hydroxyalkyl.

Examples of the alkanolamine include monoethanolamine, methylethanolamine, ethylethanolamine, isopropylethanolamine, butylethanolamine, monopropanolamine, monoisopropanolamine, methylisopropanolamine, ethylisopropanolamine, isobutylpropanolamine, monobutanolamine, methylbutanolamine, diethanolamine, diisopropanolamine, dibutanolamine, ethanolisopropanolamine, isopropanolbutanolamine and the like.

According to this invention, the compounds of the general formula (I) are produced by reacting cyanuric chloride with 4,4'-diaminostilbene-2,2'-disulfonic acid, taurine and a member selected from the group consisting of morpholine and alkanolamines.

In conducting the above reaction, the latter three kinds of starting materials may be reacted in any order. Generally, the reaction can be carried out as follows:

Two mols of cyanuric chloride are reacted with 1 mol of 4,4'-diaminostilbene-2,2'-disulfonic acid in an aqueous acetone medium at 0° C. or below for 2 hours, while the reaction mixture is being kept neutral or weakly acidic.

Then the resulting product is treated with any one of 2 mols of taurine and 2 mols of a member selected from the group consisting of the alkanolamine and morpholine at about 30° C. for 4 – 5 hours in a neutral or weakly alkaline condition and the condensate thus obtained is reacted with the remaining reactant at 90° – 95° C. for 3 – 4 hours in a weakly alkaline solution.

The final compounds of the general formula (I) are precipitated with an inorganic acid or salted out with an inorganic salt from the reaction mixture.

The compounds of the general formula (I) are excellent optical brightening agents not only for natural and artificial cellulosic textile materials but also for synthetic textile materials such as polyamide, polyvinyl, and polyester fibers. The term "textile materials" means textile fibers, yarns and threads, woven and knitted fabrics, and articles made thereof.

The important feature of the novel brightening agents is that they are particularly useful in incorporation into a treating liquid for resin finish of textile materials so that optical brightening (or whitening) and resin finishing can be conducted simultaneously without any difficulty.

It is known to effect both optical whitening and resin finish of textile materials. For this purpose the following two methods have been proposed.

1. Textile materials which have already been optically whitened or brightened are subjected to resin-finish treatment.

2. Optical brightening and resin-finishing are conducted simultaneously.

In method (1), the optical brightening and resin finishing are carried out as two respectively independent steps, and therefore any known respective processes can be applied separately. However, this method requires two separate operations and therefore is not advantageous.

In contrast, the method (2) is a single step process and therefore more advantageous than the method (1). However, in practice, it is difficult to satisfactorily conduct this method (2). As is known, a bath for conducting resin-finishing of textile materials, typically cellulosic materials, contains a resin precondensate and catalyst (inorganic or organic salt), and is made weakly acidic in order to stabilize the resin and catalyst. However, when a usual known optical brightening agent is added to such bath under such conditions mentioned above, the optical brightening agent will usually form a precipitate in the bath so that the desired optical brightening effect can not be obtained and even the resin-finish effect is adversely affected. Thus, according to Japanese Patent Publication No. 15099/60 there is disclosed a method for simultaneously conducting optical brightening and resin-finishing of textile material by adding certain optical brightening agents to a resin-finishing bath containing an amino resin precondensate and zinc nitrate or its hydrate (catalyst). Among the optical brightening agents there is mentioned one, for example, having the following formula:

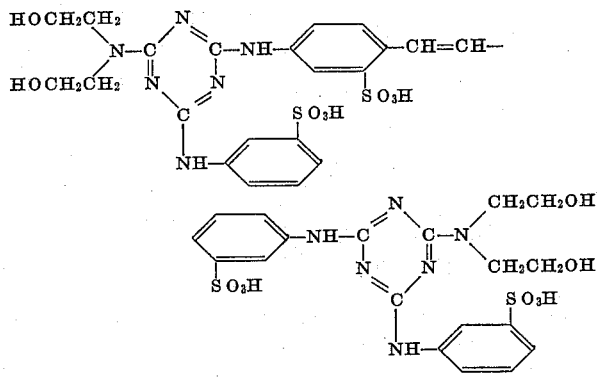

However, in the above method, there would be formed a precipitate in the bath when it is left standing for a relatively short period of time. Further, the optical whitening effect (clearness, whiteness and shade) is not sufficient.

In contrast thereto, when the optical brightening agents of the formula (I) of this invention are employed together with a resin-finishing liquid, there is no undesirable precipitate formed even if the liquid is left to stand for a prolonged period of time, and there are simultaneously obtained excellent whitening or brightening effect and resin-finishing effect without causing any difficulty encountered in conventional methods. This is surprising in view of the fact that those optical brightening agents which are disclosed in the above Japanese Patent Publication No. 15099/60 and which are similar in chemical structures to those of the present invention can not realize these satisfactory effects as mentioned above.

Thus, the present invention also provides a method for simultaneously conducting optical brightening and resin-finishing of textile materials by treating the textile materials with a liquid containing a resin precondensate, catalyst for the condensation thereof and an optical brightening agent of the formula (I).

Except the use of the optical brightening agent which is the essential feature of this invention, the formulation of the treating liquid, its application and subsequent treatment can be those well known per se in the art of resinfinishing of textile materials and therefore no detailed explanation will be required.

Thus, any suitable resin precondensate known in the art of resin-finish may be used in carrying out the method of this invention. Examples of resin precondensates are those of mono- or di-methylolurea resins, polymethylated methylol resin, dimethylolalkyleneurea resin, dimethylolurone resins, polymethylolmelamine resins, dimethylolglyoxalmonourein resins, dimethyloltriazone resins, derivatives thereof, and vinyl polymer derivatives. A mixture of any two or more of these resin precondensates may also be used.

The catalysts may also be those known per se. Examples of catalysts are inorganic salts such as ammonium sulfate; organic amine salts such as monoethanolamine hydrochloride, 2-amino-2-methyl propanol hydrochloride; metal salts such as magnesium chloride, magnesium nitrate, zinc nitrate, etc. If desired, a mixture of two or more of these salts may also be used.

The optical brightening agent of the formula (I) may be used in a concentration of 0.1 – 1.0 percent based on the total treating solution.

The resin precondensates may be generally used in a concentration of 5 – 15 percent and the catalysts in an amount of 0.2 – 5 percent based on the total weight of the resin-finishing solution, respectively.

In conducting the treatment of the textile material, the treating liquid containing the resin precondensate, catalyst and optical brightening agent of this invention is applied to the textile material by a suitable method such as spraying, padding, or dipping. Then the textile material with a pick-up of about 50 to 100 percent is subjected to a heat treatment. The conditions of the heat treatment may be those known per se. Thus, the temperature and time of this heat treatment may vary over a wide range depending upon the particular resin precondensate, catalyst, their concentrations, etc. Generally, the heat treatment is conducted at 80° to 200° C. for 1 to 3 minutes.

The invention is illustrated in the following examples. However, it is not intended to limit the invention by these examples. All parts and percentages are by weight.

EXAMPLE 1

3.7 parts of cyanuric chloride are dissolved in 18 parts of acetone and 45 parts of crushed ice are added thereto to form a suspension. To this suspension is dropwise added over 2 hours a neutral solution prepared by adding 3.7 parts of 4,4'-diaminostilbene-2,2'-disulfonic acid to 45 parts of water and adding soda ash thereto. Meanwhile the solution is kept neutral or weakly acid at 0° C.

Then 2.5 parts of taurine are added, to the solution. The resulting solution is gradually warmed to 30° C. and is kept neutral or weakly alkaline with the addition of soda ash for 4 to 5 hours. Then 2.1 parts of morpholine are added thereto. The solution is gradually warmed to 90° to 95° C. and is kept neutral or weakly alkaline with the addition of soda ash for 3 to 4 hours.

Then hydrochloric acid is added to the resulting solution to render the same strongly acidic. The formed precipitate is separated by filtration. Soda ash is added to the wet filter cake to convert the same into sodium salt. The salt is dried at 90° C. to obtain 9.0 parts of 4,4'-bis (2-β-sulfoethylamino-4-morpholino-1,3,5-triazine-6-ylamino) stilbene-2,2'-disulfonate.

EXAMPLE 2

3.7 parts of cyanuric chloride are dissolved in 20 parts of acetone and 50 parts of crushed ice are added thereto to form a suspension.

A neutral aqueous solution of 3.7 parts of 4,4'-diaminostilbene-2,2'-disulfonic acid dissolved in 50 parts of water is dropwise added thereto over 2 hours. Meanwhile the solution is kept neutral or weakly acidic.

Then 1.8 parts of monoisopropanolamine are added. The solution is gradually warmed to 30° C. and is kept neutral or weakly alkaline with the addition of soda ash for 4 to 5 hours. Then the solution is salted out with the addition of table salt in an amount of 20 percent based on the liquid. The formed precipitate is separated by filtration. The wet filter cake is dissolved in 100 parts of water. To the solution are added 3 parts of taurine. The solution is gradually warmed to 90° to 95° C. and is kept neutral or weakly alkaline with the addition of soda ash for 3 to 4 hours.

After the reaction, hydrochloric acid is added to the solution to render the same strongly acidic. The formed precipitate is separated by filtration. Soda ash is added to the wet filter cake to form sodium salt. The salt is dried at 90° C. to obtain 8.6 parts of 4,4'-bis(2-β-sulfoethylamino-4-monoisopropanolamino-1,3,5-triazine-6-ylamino)stilbene-2,2'-disulfonate.

EXAMPLE 3

Two mols of cyanuric chloride is reacted with 1 mol of 4,4'-diaminostilbene-2,2'-disulfonic acid, 2 mols of taurine and 2 mols of alkanolamine in any order to obtain compounds shown in the following table. The yield is very high.

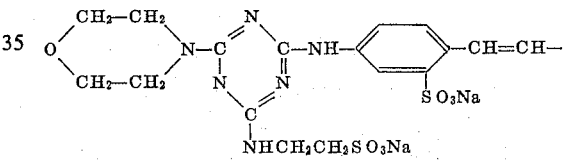

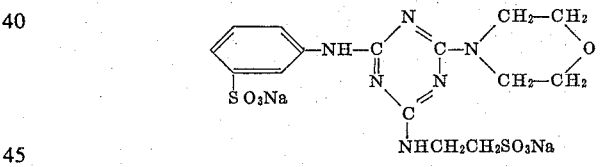

| Compound No. | X | Alkanolamine |
|---|---|---|
| 3 | —NHCH$_2$CH$_2$OH | Monoethanolamine |
| 4 | —N(CH$_3$)(CH$_2$CH$_2$OH) | Methylethanolamine |
| 5 | —N(CH$_2$CH$_2$OH)(CH$_2$CH$_2$OH) | Diethanolamine |
| 6 | —N(CH$_2$CHOHCH$_3$)(CH$_2$CHOHCH$_3$) | Diisopropanolamine |
| 7 | —N(CH$_2$CH$_2$CH$_2$CH$_3$)(CH$_2$CH$_2$OH) | Buthylethanolamine |

EXAMPLE 4

Each of the optical brightening agents obtained in Examples 1 – 3 is mixed with a substantially equivalent amount of an inorganic salt. The resulting product is mixed with other ingredients in the below mentioned rates (A + B) to prepare 100 parts of a resin-finishing bath:

| | | |
|---|---|---|
| A | Dimethylolalkyleneurea type resin precondensate | 10 parts |
| | Magnesium chloride (catalyst) | 5 parts |
| | Water | 35 parts |
| B | Optical brightening agent | 0.6 part |
| | Water | 49.4 parts |

A cotton broadcloth of 40 deniers is padded with the above mentioned bath so as to be of 60 percent pick-up. Then the cloth is dried at 100° C. for 2 minutes and then at 160° C. for 3 minutes.

Then the cloth is dipped in an aqueous solution containing 0.2 percent sodium alkylsulfonate and 0.2 percent soda ash at 40° C. for 15 seconds and is washed with water and dried.

The thus obtained cotton broadcloth shows a very high whiteness.

Further, the above mentioned resin-finishing bath (A + B) is high in stability so that, even when it is left standing overnight, no precipitate or white turbidity is produced.

Even when the cotton broadcloth is treated in the same manner with the resin-finishing bath left standing overnight, the same excellent results are obtained.

EXAMPLE 5

| | | |
|---|---|---|
| A | Dimethyloltriazone type resin precondensate | 10 parts |
| | Zinc nitrate hydrate catalyst | 5 parts |
| | Water | 35 parts |
| B | Optical brightening agent (of following formula) | 0.6 part |
| | Water | 49.4 parts |

A and B in the above are mixed to prepare a resin-finishing bath.

A mercerized cotton broadcloth of 40 deniers is padded with the above mentioned bath so as to be of 75 percent pick-up and is dry-heated at 100° C. for 2 minutes, then at 150° C. for 2 minutes and finally at 170° C. for 1 minute. The cloth is then dipped in an aqueous solution containing 0.2 percent Monogen and 0.2 percent soda ash at 40° C. for 1 minute and is washed with water and dried. The thus obtained cotton broadcloth shows a high whiteness and an unimpaired resin-finish effect.

Also a high whiteness and resin-finishing effect can be obtained by increasing the whiteness of a cotton broadcloth according to such known process as padding in advance with the optical brightening agent B and then resin-finishing the same under the above mentioned conditions with a bath of A made to 100 parts by adding water.

Further, the above mentioned resin-finishing bath (A + B) is high in stability, and even when it is left standing overnight, no white turbidy or precipitate is produced.

Even when the cotton broadcloth is treated in the same manner with the resin-finishing bath left standing overnight, the same results are obtained.

EXAMPLE 6

Some of the concrete prescriptions of the resin finishing bath which can be applied under the processing conditions according to Example 5 are shown below. Each of the prescriptions as made to 100 parts with the addition of the optical brightening agent of the following structure and water is applied to fibers:

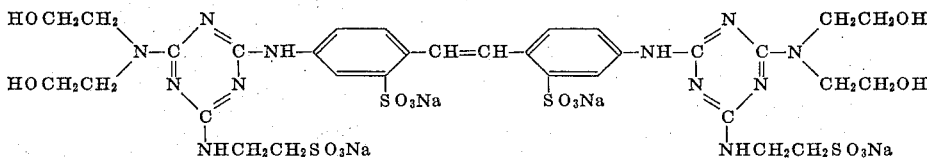

With each prescription, a high workability, high whiteness and high resin finishing effect can be obtained.

Prescription 1:
    Dimethylolalkyleneurea type
    resin precondensate    5 parts
    Magnesium chloride (catalyst)    0.6 part
Prescription 2:
    Dimethylolalkyleneurea type
    resin precondensate    5 parts
    Monoethanolamine hydrochloride
    (catalyst)    0.2 part
Prescription 3:
    Dimethyloltriazone type resin
    precondensate    5 parts
    Zinc nitrate hydrate (catalyst)    0.5 part
Prescription 4:
    Dimethyloltriazone type resin
    precondensate    5 parts
    Magnesium chloride (catalyst)    0.9 part
Prescription 5:
    Dimethylolgyoxalmonourein type
    resin precondensate    5 parts
    Zinc nitrate hydrate (catalyst)    0.5 part
Prescription 6:
    Dimethylolgyoxalmonourein type
    resin precondensate    5 parts
    Magnesium nitrate (catalyst)    0.25 part
    Zinc nitrate hydrate (catalyst)    0.25 part
Prescription 7:
    Dimethylolurone type resin
    precondensate    5 parts
    Zinc nitrate hydrate (catalyst)    0.5 part
Prescription 8:
    Dimethylolurone type resin
    precondensate    5 parts
    Magnesium chloride (catalyst)    0.9 part
Prescription 9:
    Mono or dimethylolurea type resin
    precondensate    5 parts
    2-amino-2-methylpropanol
    hydrochloride (catalyst)    0.25 part
Prescription 10:
    Polymethylolated melamine type
    resin precondensate    5 parts
    Zinc nitrate hydrate (catalyst)    0.5 part
Prescription 11:
    Polymethylolated melamine type
    resin precondensate    5 parts
    Magnesium chloride (catalyst)    0.5 part
Prescription 12:
    Polymethylolated melamine type
    resin precondensate    5 parts
    Monoethanolamine hydrochloride
    (catalyst)    0.3 part

EXAMPLE 7

A    Polymethylolated melamine
    type resin precondensate    15 parts
    2-amino-2-methylpropanol
    (catalyst)    1 part
    Water    54 parts B    Optical brightening agent (of
    the following formula)    0.3 part
    Water    29.7 parts

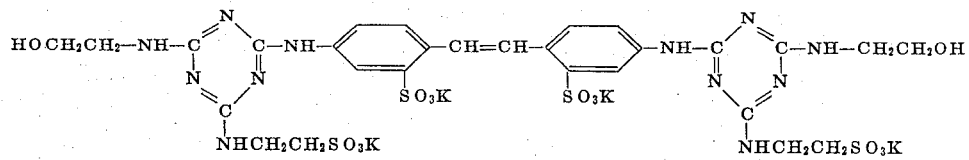

A and B in the above are mixed to prepare a resin-finishing bath.

A thin polyamide fabric (nylon share) is padded with the above mentioned bath so as to be of 60 percent pick-up and is dry-heated at 200° C. for 60 seconds. The thus obtained polyamide reaches a high whiteness and the resin-finishing effect is not impaired by the simultaneous use of the optical brightening agent.

Also, the below mentioned resin and catalyst can be used instead of A in the prescription:

Polymethylated
    methylolurea
    type resin
    precondensate    15 parts
    2-amino-2-
    methylpropanol
    hydrochloride
    (catalyst)    1 part
    Water    54 parts

EXAMPLE 8

A    Saponified copolymer of vinyl
    acetate and 2-allylidene    5 parts
    acetate (vinyl polymer type
    resin)
    Dimethylolalkyleneurea type
    resin precondensate    4 parts
    Water    51 parts B    Optical brightening agent (of
    the following formula)    0.2 part
    Water    19.8 parts

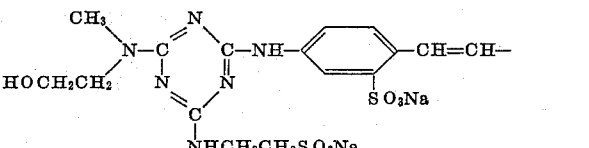
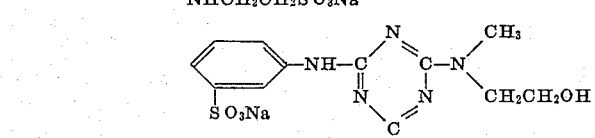

C    Magnesium chloride (catalyst)    0.6 part
    Water    19.2 parts

B and C are mixed with A to prepare a resin-finishing bath. A mix-spun vinylon-rayon (50/50) serge is padded with the bath so as to be 55 percent pick-up. Then the cloth is pre-dried at 80° C. for 2 minutes and then dry-heated at 140° C. for 3 minutes. Then it is dipped in an aqueous solution of 0.2 percent Monogen and 0.2 percent soda ash at 40° C. for 5 seconds and is water-washed and dried. The thus obtained mix-sun vinylon-rayon product shows a high whiteness and unimpaired resin-processing effect.

EXAMPLE 9

| | | |
|---|---|---|
| A | Saponified copolymer of vinyl acetate and 2-allylidene acetate (vinyl polymer type resin precondensate) | 5 parts |
| | Dimethylolalkyleneurea type resin precondensate | 10 parts |
| | Water | 4.5 parts |
| B | Optical brightening agent (of the following formula) | 0.2 part |
| | Water | 19.8 part |

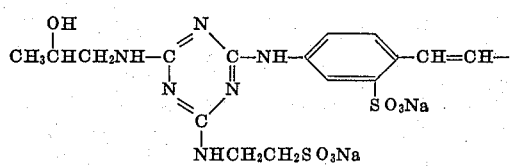

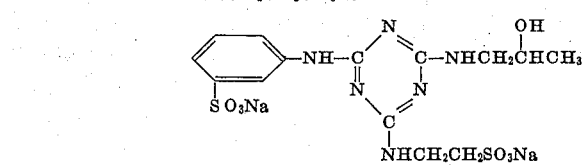

| | | |
|---|---|---|
| C | Magnesium chloride (catalyst) | 1.5 parts |
| | Water | 18.5 parts |

B and C are mixed with A to prepare a resin-finishing bath.

A mixed-spun polyester-rayon (50/50) broadcloth of 40 deniers is padded with the above mentioned bath so as to be of 60 percent pick-up. Then the cloth is pre-dried at 80° C. for 2 minutes and then dry-heated at 150° C. for 3 minutes. Then it is dipped in an aqueous solution containing 0.2 percent Monogen and 0.2 percent soda ash at 40° C. for 5 seconds and is water-washed and dried. The thus obtained mix-spun polyester-rayon broadcloth shows a high whiteness and unimpaired resin-processing effect.

What we claim is:

1. A compound of the formula

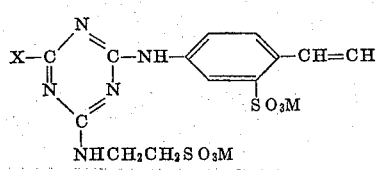

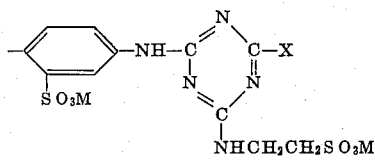

wherein X is morpholino or a group of the formula

wherein $R_1$ and $R_2$ are individually a hydrogen atom, an alkyl group having 1 to 4 carbon atoms or a hydroxyalkyl group having two to four carbon atoms, provided that at least one of $R_1$ and $R_2$ is a hydroxyalkyl group as defined above, and M is a hydrogen atom or an alkali metal.

2. A compound of the formula

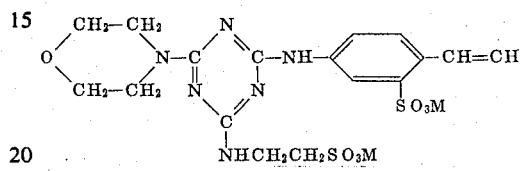

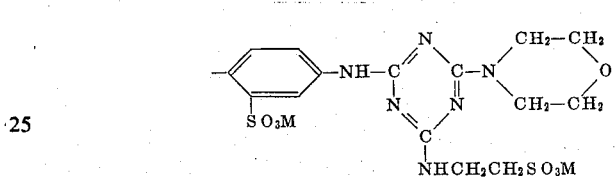

wherein M is a hydrogen atom or an alkali metal.

3. A compound of the formula

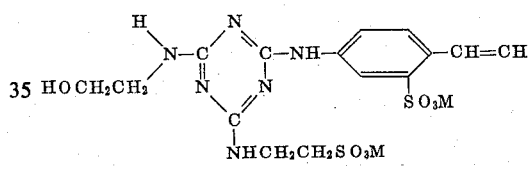

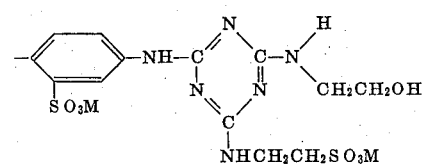

wherein M is a hydrogen atom or an alkali metal.

4. A compound of the formula

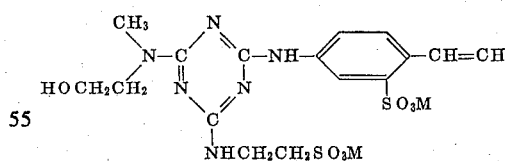

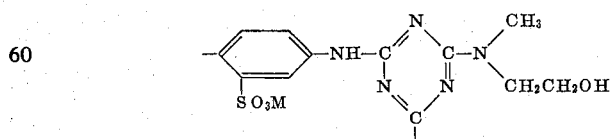

wherein M is a hydrogen atom or an alkali metal.

5. A compound of the formula

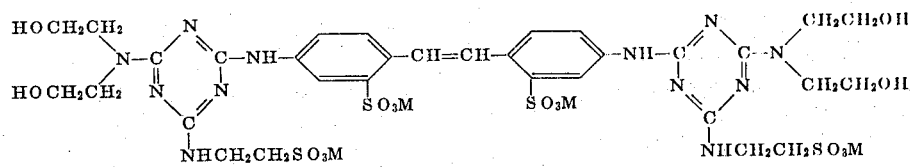
wherein M is a hydrogen atom or an alkali metal.
6. A compound of the formula
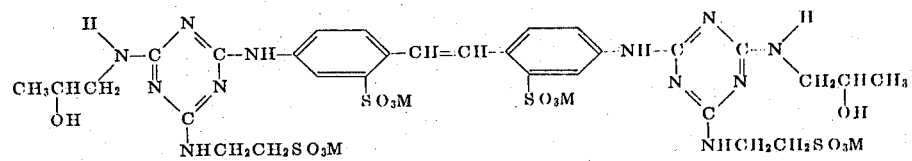
wherein M is a hydrogen atom or an alkali metal.
7. A compound of the formula
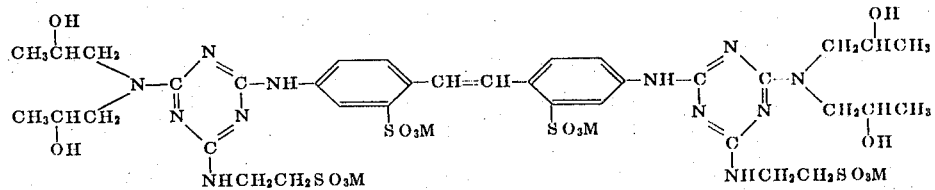
wherein M is a hydrogen atom or an alkali metal.
* * * * *